United States Patent
Ma et al.

(10) Patent No.: US 9,996,900 B2
(45) Date of Patent: Jun. 12, 2018

(54) METHODS AND SYSTEMS FOR DEMOSAICING AN IMAGE

(71) Applicant: NANYANG TECHNOLOGICAL UNIVERSITY, Singapore (SG)

(72) Inventors: Kai-Kuang Ma, Singapore (SG); Wei Ye, Singapore (SG)

(73) Assignee: NANYANG TECHNOLOGICAL UNIVERSITY, Singapore (SG)

( * ) Notice: Subject to any disclaimer, the term of this patent is extended or adjusted under 35 U.S.C. 154(b) by 0 days. days.

(21) Appl. No.: 15/115,906

(22) PCT Filed: Feb. 5, 2015

(86) PCT No.: PCT/SG2015/000031
§ 371 (c)(1),
(2) Date: Aug. 1, 2016

(87) PCT Pub. No.: WO2015/119574
PCT Pub. Date: Aug. 13, 2015

(65) Prior Publication Data
US 2017/0161872 A1    Jun. 8, 2017

Related U.S. Application Data

(60) Provisional application No. 61/936,005, filed on Feb. 5, 2014.

(51) Int. Cl.
G06K 9/00 (2006.01)
G06T 3/40 (2006.01)

(52) U.S. Cl.
CPC ......... *G06T 3/4015* (2013.01); *G06T 3/4007* (2013.01)

(58) Field of Classification Search
CPC ........... H04N 2209/046; G06T 3/4015; G06T 2207/10024; G06T 5/002
See application file for complete search history.

(56) References Cited

U.S. PATENT DOCUMENTS

3,971,065 A    7/1976  Bayer
2004/0032516 A1  2/2004  Kakarala
(Continued)

FOREIGN PATENT DOCUMENTS

WO    2015119574 A1    8/2015

OTHER PUBLICATIONS

Chang et al.; "Color filter array recovery using a threshold-based variable number of gradients"; Proceedings of the SPIE, vol. 3650, p. 36-43; Mar. 1999.*

(Continued)

*Primary Examiner* — Eueng-Nan Yeh

(57) ABSTRACT

Methods and systems are presented for converting a mosaiced image in which, for each pixel, a single color intensity value is defined for only one corresponding color, into a full color image in which, for each pixel, color intensity values are defined for each of three colors. For each color, the intensity values of the mosaiced image are interpolated, and regression filtering is performed using the intensity values of one or both of the other colors. Residual values are found as the difference between the result of the regression filtering and the mosaiced image, and these are interpolated, and added to the output of the regression, to form a full color image. The process may be iterated. In each iteration, the regression is performed using the refined channel images generated in the previous iteration.

11 Claims, 5 Drawing Sheets

(56) References Cited

U.S. PATENT DOCUMENTS

2006/0279585 A1    12/2006   Milanfar et al.
2014/0355872 A1*   12/2014   Shih .......................... G06T 7/90
                                                                                  382/164

OTHER PUBLICATIONS

Gunturk et al.; "Demosaicking: Color filter array interpolation in single-chip digital cameras"; IEEE Signal processing magazine; vol. 22, Issure 1; Jan. 2005.*

Foreign Communication From a Related Counterpart Application, International Search Report and Written Opinion dated Apr. 29, 2015, International Application No. PCT/SG2015/000031 filed on Feb. 5, 2015.

Kiku, D., et al., "Residual interpolation for color image demosaicking", International conference on image processing 2013, pp. 2304-2308. Sep. 2013.

D. Menon, S. Andriani, and G. Calvagno, "Demosaicing with directional filtering and a posteriori decision," IEEE Trans. on Image Processing, vol. 16, No. 1, pp. 132-141, 2007, (published before this application Aug. 2016).

D. Pally, V. Katkovnik, R. Bilcu, S. Alenius, and K. Egiazarian, "Spatially adaptive color filter array interpolation for noiseless and noisy data," International Journal of Imaging Systems and Technology, vol. 17, No. 3, pp. 105-122, 2007, (published before this application Aug. 2016).

K. H. Chung and Y. H. Chan, "Low-complexity color demosaicing algorithm based on integrated gradients," Journal of Electronic Imaging, vol. 19, No. 2, pp. 021104, 2010, (published before this application Aug. 2016).

I. Pekkucuksen and Y. Altunbasak, "Gradient based threshold free color filter array interpolation," in Proc. of IEEE Int. Conf. on Image Processing, Hong Kong, 2010, pp. 137-140, (published before this application Aug. 2016).

L. Zhang, X. Wu, A. Buades, and X. Li, "Color demosaicking by local directional interpolation and nonlocal adaptive thresholding," Journal of Electronic Imaging, vol. 20, No. 2, pp. 023016, 2011, (published before this application Aug. 2016).

I. Pekkucuksen and Y. Altunbasak, "Multiscale gradients based color filter array interpolation," IEEE Trans. on Image Processing, vol. 22, No. 1, pp. 157-165, 2013, (published before this application Aug. 2016).

K. He, J. Sun, and X. Tang, "Guided image filtering," IEEE Trans. on Pattern Analysis and Machine Intelligence, vol. 35, No. 6, pp. 1397-1409, 2013, (published before this application Aug. 2016).

D. Kiku, Y. Monno, M. Tanaka, and M. Okutomi, "Minimized-laplacian residual interpolation for color image demosaicking," in IS&T/SPIE Electronic Imaging. International Society for Optics and Photonics, 2014, pp. 90230L-90230L, (published before this application Aug. 2016).

X. Li, B. Gunturk, and L. Zhang, "Image demosaicing: A systematic survey," in Proc. of SPIE, 2008, pp. 68221J-68221J-15, (published before this application Aug. 2016).

* cited by examiner

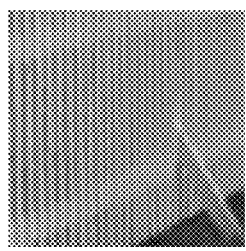
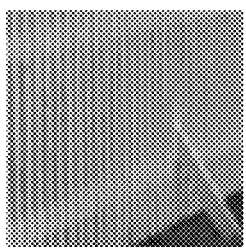
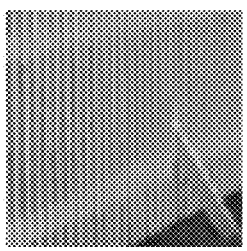
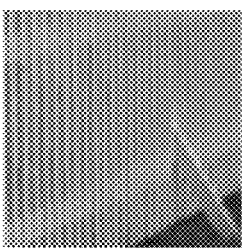
Fig. 8(a)    Fig. 8 (b)    Fig. 8 (c)    Fig. 8 (d)
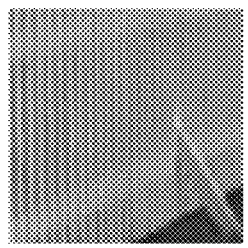
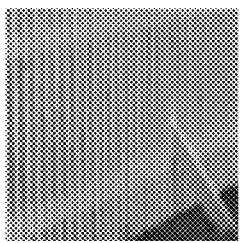
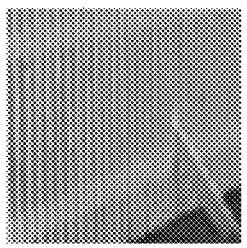
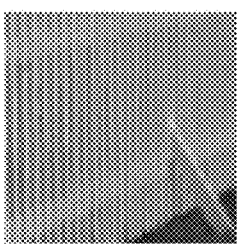
Fig. 8(e)    Fig. 8(f)    Fig. 8(g)    Fig. 8(h)

METHODS AND SYSTEMS FOR DEMOSAICING AN IMAGE

CROSS-REFERENCE TO RELATED APPLICATIONS

The present application is a filing under 35 U.S.C. 371 as the National Stage of International Application No. PCT/SG2015/000031, filed Feb. 5, 1215, entitled "METHODS AND SYSTEMS FOR DEMOSAICING AN IMAGE," which claims the benefit of U.S. Provisional Application No. 61/936,005 filed on Feb. 5, 2014, both of which are incorporated herein by reference in their entirety for all purposes.

FIELD OF THE INVENTION

The present invention relates to transforming a mosaiced image—that is, a two-dimensional color image in which for each pixel an intensity value is defined for only a single color—into an image in which, for each pixel, a respective intensity value is defined for each of three colors (a "full color image").

BACKGROUND OF THE INVENTION

A color image captured by a single image sensor is typically a "mosaiced image". This is commonly produced by using a color filter array (CFA), on which the pixels are arranged in the Bayer pattern [1], such that only one of the three primary color components (i.e., R, G, or B) is recorded at each pixel location. Demosaicing is the reverse process of mosaicing, which restores an approximate full color image based on the acquired mosaiced image. One strategy commonly practiced in the majority of demosaicing methods [2-7] is to interpolate the missing pixels on the G channel first, for this channel has the highest sampling density among all three channels in the Bayer pattern; to be exact, the number of pixels with known values is exactly twice that of the R channel and of the B channel, respectively. The missing pixels on the R and B channels are then restored by interpolating the color component difference fields R-G and B-G, respectively. This is based on the observation that the color-component differences are usually locally smooth.

Recently, a new demosaicing approach was proposed in [8], which is based on so-called residual interpolation (RI). Instead of conducting interpolation on the color-component difference (CD) fields, the demosaicing algorithm as described in [8] performs interpolation over the residual fields. Note that a residual incurred at each pixel is the difference between a known color value (i.e., ground truth) and its estimated value. If the estimated values are sufficiently close to the ground truth, the resultant residual field will be much smoother than the color-component difference field, especially when there is a sharp color transition. This indicates that interpolation conducted on the residual fields has a potential to yield a better reconstructed image.

We now explain the residual interpolation (RI) of [8] in more detail, with reference to FIG. 1. The input to the method is referred to as p, which is one of the red (R) or blue (B) channels of the mosaiced image. p is demosaiced under the guidance of a complete image d. In [8], the complete image d is a G-channel image obtained via the GBTF [5] method. FIG. 1 shows the RI-based reconstruction scheme for restoring the R channel (that is, $p=R_m$). An equivalent algorithm is performed for the B channel.

For each color channel under reconstruction, the RI process consists of two stages: (1) generating the estimated channel image and computing the corresponding residual field, and (2) interpolating the residual field, and using it for compensating the estimated channel image.

In Stage (1), the estimated image $\bar{p}$ is obtained by using a regression filter (also known as the guided filter) [9]. A regression filter is a filter which, at each given pixel of an image, modifies a first intensity value (p) at that pixel, using the first intensity values in a window centred at the given pixel, and second pixel intensity values (guide values d) of the pixels within the window. Specifically it is defined as $$\bar{p}(i,j) = \frac{\sum_{(u,v)\in w_{i,j}} a(u,v)}{MN} \cdot d(i,j) + \frac{\sum_{(u,v)\in w_{i,j}} b(u,v)}{MN} \quad (1)$$

where $w_{i,j}$ is the M×N local window centered at pixel (i, j). The coefficients a(u, v) and b(u, v) are first computed at each pixel location (u, v) by performing linear regression between p and d over the M×N local window $w_{u,v}$ centered at (u, v). For ease of presentation, the above-described regression filtering process is denoted as: $\bar{p}=\Re(p|d)$. Then, the residuals can be computed as $\Delta p=p-\bar{p}$, involving only those known values.

In Stage (2), bilinear interpolation is applied to $\Delta p$ to obtain the estimated $\overline{\Delta p}$, which is used to compensate the estimated image $\bar{p}$ to generate the reconstructed image q.

As for the green colors of the demosaiced image, they are obtained using another approach, called the gradient-based threshold free (GBTF) demosaicing [5].

SUMMARY OF THE INVENTION

The present invention aims to provide new and useful systems and methods for demosaicing an image.

The present inventors have observed that the RI-based demosaicing method as described in [8] did not fully exploit the power of the RI-based strategy, since as noted above the reconstruction of the G channel is mainly based on another approach.

By contrast, a first aspect of the present invention proposes, in general terms a demosaicing algorithm in which the RI-based strategy is applied to the G channel, using guidance images generated from the red and blue channels. This makes it possible to perform regression filtering for each of the red, green and blue channels using a guidance image obtained from intensity values from one or both of the other color channels.

Preferably, the method is performed separately in the vertical and horizontal directions to produce respective full-color images which are then combined. Advantageously, this can be done by weighting the images according to which is more likely to be reliable.

In an independent aspect of the invention, freely combinable with the first, the present invention further proposes, an iterative approach to at least the green channel (also referred to here as the "G channel"). That is, the demosaiced image produced in each iteration is used as an input to the next iteration, to perform the regression filtering. Once the green channel has been restored, the red and blue channels (also referred to here as the "R channel" and the "B channel") are reconstructed from it, respectively, such as using the conventional RI process.

Using these ideas in combination, the present invention proposes an iterative RI process, which is deployed to the green channel for generating a more accurately reconstructed G channel. Note that in the proposed iterative RI process, the RI process is actually applied to all the three channels by letting one channel being reconstructed under the guidance from the other channel, and vice versa. This is due to the fact that the missing samples situated on both channels are completely non-overlapped from each other; hence, the pixels with known values from one channel can guide those pixels with missing values from the other channel, and vice versa. For example, the missing values on the G channel can be estimated under the guidance of the known values from the corresponding positions in the R channel, and vice versa. This is also applied to the mutual guidance between the G channel and the B channel, likewise. As a result, each channel image may serve as both the input image p and the guidance image d in the regression filtering process.

The above-mentioned processing steps are repeated for each iteration; in this case, the refined images obtained from the previous iteration will be used as the input images in the current iteration. However, one should note that all the above-mentioned processing is to restore a high-quality G channel through progressively refining the G channel in each iteration. Once the G channel has been reconstructed, the R channel and B channel will be separately reconstructed based on it, such as using the conventional RI process. Apparently, the improvement on G channel will greatly benefit the quality of the reconstructed R and B channels. Extensive simulations conducted on two commonly-used test datasets have clearly demonstrated that embodiments of the invention may out-perform the existing state-of-the-art demosaicing methods, both on objective performance evaluation and on subjective perceptual quality.

The invention can be expressed as a method, or as a system (that is an apparatus) comprising a processor and a memory device storing program instructions which, when followed by the processor, cause the method to be carried out. The system may be a general purpose computer (e.g. a personal computer (PC)) or camera. That is, the system may include an image capturing device for generating the mosaiced image which is the input to the method. The invention may also be expressed as a computer program product, such as one on a tangible data storage device.

BRIEF DESCRIPTION OF THE DRAWINGS

An embodiment of the invention will now be described with reference to the following drawings in which:

FIG. 8, which is composed of FIG. 8(*a*) to (*h*), shows demosaicing results for a region in the "Kodak 8" image using eight respective algorithms.

DETAILED DESCRIPTION OF THE EMBODIMENT

An embodiment of the invention will be described with reference to FIGS. 2 and 3. The embodiment is a RI-based demosaicing algorithm in which the RI process is deployed in a unified and iterative way to all the three channels to reconstruct a much more accurate G channel, which is more accurate than in method [8]. From the G channel, the R and B channels can be more accurately restored as well.

Figure 2:
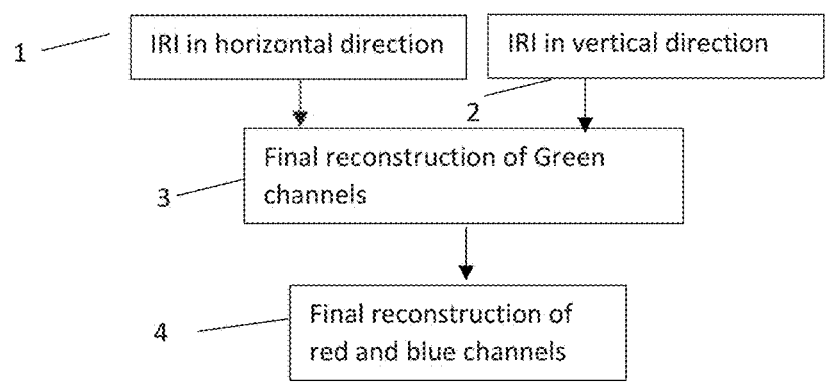
FIG. 2 shows the steps of a method which is an embodiment of the invention.

As shown in FIG. 2, the proposed iterative RI-based reconstruction scheme is conducted in steps 1 and 2 (which in variants of the embodiment may be in the other order, or indeed performed concurrently) along the horizontal direction (step 1) and the vertical direction individually (step 2). Consequently, two G channel images are generated and are linearly combined together to produce the final reconstructed G channel.

Figure 3:
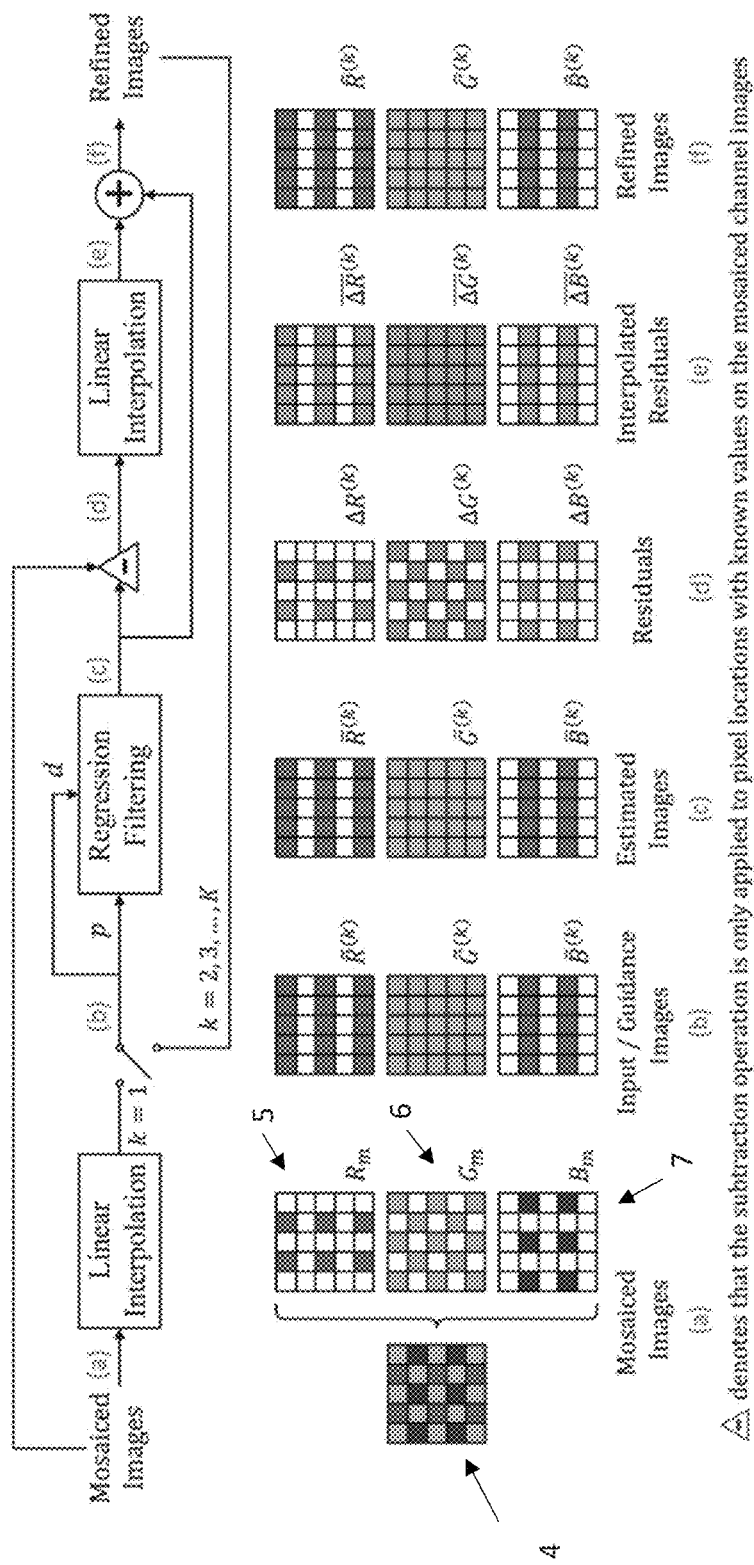
FIG. 3 shows schematically the steps of one portion of the method of FIG. 2.

The horizontal processing flow (step 1) is depicted in the upper portion of FIG. 3. For the vertical direction, the entire operation is performed in the same way, except with a small number of modifications (explained below) to adapt it to the vertical direction. The lower portion of FIG. 3 has three rows (respectively for the red, green and blue colors) and shows by shading those pixels of a typical 5×5 region of the pixel array for which a color intensity value is defined at that stage of the method. The steps of FIG. 3 are as follows.

The input to the method is a Bayer mosaiced image (labelled (a) in FIG. 3). A typical 5×5 pixel portion of this image is labelled 4 in the image. At each of the 25 pixels of this region, an intensity value is defined for one of the three colors. The 5×5 pixel array 5 shows, by shading, those pixels for which a red intensity value is defined on the mosaiced R channel, i.e., $R_m$. The 5×5 pixel array 6 shows, by shading, those pixels for which a green intensity value is defined on the mosaiced G channel, i.e., $G_m$. The 5×5 pixel array 7 shows, by shading, those pixels for which a blue intensity value is defined on the mosaiced B channel, i.e., $B_m$.

An iterative procedure is now performed, in K steps labelled by an integer k, k=1, . . . , K.

We will begin by discussing the k=1 case. First, a simple finite impulse response (FIR) filter, with three coefficient taps [½, 1, ½], is first applied to each channel $R_m$, $G_m$ and $B_m$ for conducting linear interpolation to produce three interpolated images, $\tilde{R}^{(1)}$, $\tilde{G}^{(1)}$ and $\tilde{B}^{(1)}$ (labelled (b) in FIG. 3). (In the equivalent sub-step of step 2, the FIR filter is instead $[½, 1, ½]^T$).

The RI process is then employed to refine each interpolated channel image (as the input image, p) under the guidance of another interpolated channel image (the guidance image, d). In the embodiment, the RI process is used as a refining process, rather than a reconstruction process as employed in [8]; that is, the RI is exploited not only to the initially interpolated pixel values but also to the ones in follow-up iterations.

Note that all the three channels help each other during the refining process, since the known values of the three channels are non-overlapped on the Bayer mosaiced image. Therefore, each image (b) can serve both roles—i.e., as the input image p and as the guidance image d. By using the regression filter, three estimated images, $\overline{R}^{(1)}$, $\overline{G}^{(1)}$ and $\overline{B}^{(1)}$ (denoted by (c) in FIG. 3) are generated. That is, $$\overline{R}^{(1)}=\mathfrak{R}(\tilde{R}^{(1)}|\tilde{G}_{\tilde{R}}^{(1)}) \text{ and } \overline{B}^{(1)}=\mathfrak{R}(\tilde{B}^{(1)}|\tilde{G}_{\tilde{B}}^{(1)}) \quad (2)$$

where $\tilde{G}_{\tilde{R}}^{(1)} \cup \tilde{G}_{\tilde{B}}^{(1)} = \tilde{G}^{(1)}$, the subscript $\tilde{R}$ in $\tilde{G}_{\tilde{R}}^{(1)}$ denotes that only those rows in $\tilde{G}^{(1)}$ that correspond to the rows in $\tilde{R}^{(1)}$ that have values will be involved in the regression filtering process, and the subscript $\tilde{B}$ in $\tilde{G}_{\tilde{B}}^{(1)}$ denotes that only those rows in $\tilde{G}^{(1)}$ that correspond to the rows in $\tilde{B}^{(1)}$ that have values will be involved in the regression filtering process.

As discussed previously, the initially interpolated images $\tilde{G}_{\tilde{R}}^{(1)}$ and $\tilde{G}_{\tilde{B}}^{(1)}$ can be also refined under the guidance of $\tilde{R}^{(1)}$ and $\tilde{B}^{(1)}$ separately. Therefore, $$\overline{G}\tilde{R}^{(1)}=\mathfrak{R}(\tilde{G}_{\tilde{R}}^{(1)}|\tilde{R}^{(1)}) \text{ and } \overline{G}_{\tilde{B}}^{(1)}=\mathfrak{R}(\tilde{G}_{\tilde{B}}^{(1)}|\tilde{B}^{(1)}) \quad (3)$$

The estimated images (shown as (c) in FIG. 3) are then subtracted from their corresponding Bayer mosaiced channel images (a), respectively, to generate the residual fields $\Delta R^{(1)}$, $\Delta G^{(1)}$ and $\Delta B^{(1)}$, shown as (d) in FIG. 3. For each color, this operation is performed only at the pixel locations for which ground truth intensity values exist in the mosaiced channel image.

The 3-tap FIR filter used previously is exploited here again to conduct linear interpolation for each residual field along the horizontal direction to generate the interpolated residual fields $\overline{\Delta R}^{(1)}$, $\overline{\Delta G}^{(1)}$ and $\overline{\Delta B}^{(1)}$, shown as (e) in FIG. 3. (The corresponding step of FIG. 2 again uses the transpose of the 3-tap filter).

These fields are then added back to the estimated channel images to give the refined images $\hat{R}^{(1)}$, $\hat{G}^{(1)}$ and $\hat{B}^{(1)}$ as illustrated by (f) in FIG. 3.

The above-described refining process will be repeated to further refine the channel images through K−1 additional iterations (i.e., k=2, . . . , K).

Two Design Issues of the Iterative Process

Two important issues in the iterative RI process are now investigated: 1) the window size of the regression filter, and 2) the stopping criterion for the iterative RI (IRI) process.

It has been observed through extensive simulations that different test images may favor fairly different window sizes, therefore using a fixed window size for all test images is not advisable. Whereas it is difficult to find a mathematically optimal window size configuration for each test image, a simple yet effective strategy is developed in this work to select a suitable configuration from a set of predefined candidates. The selection process will be carried out before entering the iteration loop of the IRI process. To be specific, it will be performed right after the initially interpolated images, i.e. $\hat{R}^{(1)}$, $\tilde{G}^{(1)}$ and $\hat{B}^{(1)}$, are generated. In our approach, a window size configuration is defined as S=(M, N), which indicates the local window size will be M×N for the horizontal IRI process, and N×M for the vertical one. That is, we force the horizontal and vertical IRI processes (steps 1 and 2 respectively) to use local windows of the same size, but with different orientations.

The candidate window size configuration set is denoted by $\Psi=\{S_t : t=1, 2 \ldots, T\}$, where each candidate configuration is set as $S_t=(M_t,N_t)=(2t+1,4t+1)$.

It has been observed that in most cases using a smaller local window size will yield more accurate estimated values produced by the regression filter, leading to smoother residual fields. However, it will also reduce the reliability and robustness of the local linear regression, as both the total number and the spatial range of the involved pixels are reduced. To obtain a trade-off between these two aspects, the proposed strategy is to select a window size configuration from $\Psi$ that is as large as possible, on the premise that the smoothness of the residual fields under such configuration satisfies a predefined requirement. Let $\gamma_t$ denote the smoothness of the residual field when a candidate window size configuration $S_t$ is adopted, which is measured by computing the average absolute-valued residual gradients. The proposed window size selection strategy is to find the largest window size configuration $S_t$ in $\Psi$ that satisfies $\gamma_t < \mu$, where $\mu$ is a threshold.

In the experimental results from using the embodiment explained below, the size of $\Psi$ is set to be T=4, and the threshold $\mu = c \cdot \gamma_1$, where c is a constant greater than 1. In the experiments reported below, c is empirically set as 1.3.

As to the stopping criterion, the convergence property of the proposed IRI process has been examined by checking the mean absolute difference (MAD) between the refined G-channel images obtained in iteration k and in iteration k−1.

Figure 4:
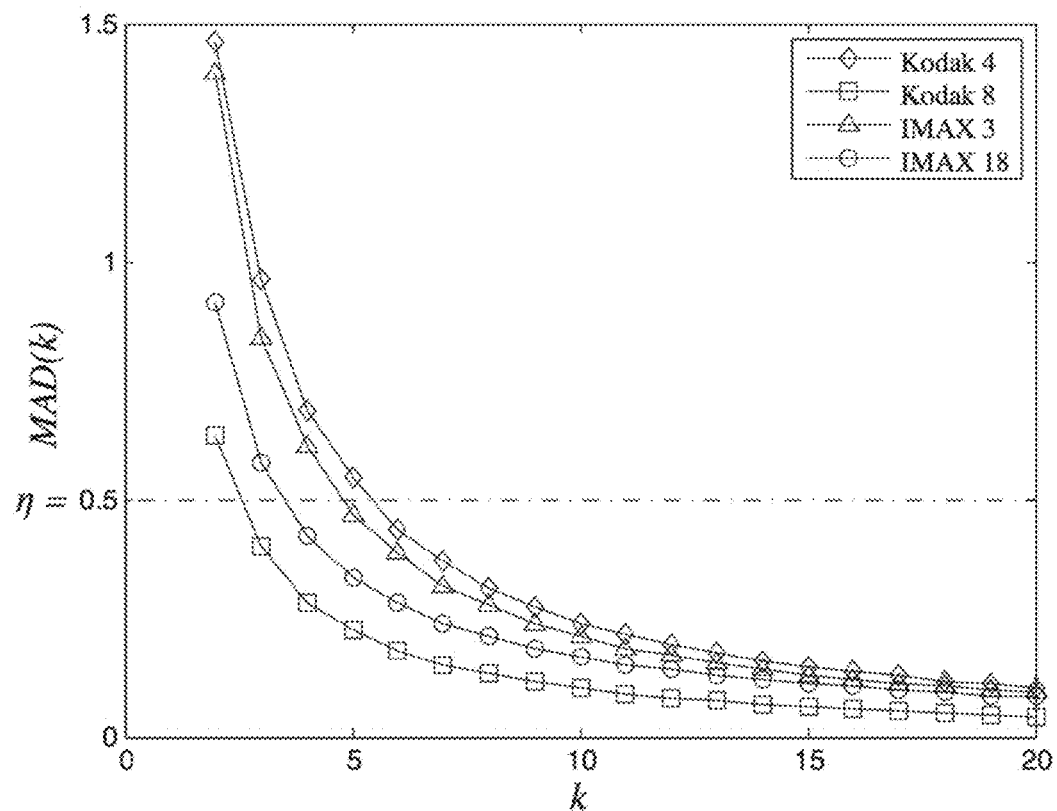
FIG. 4 shows how a parameter MAD(k) varies for the process of FIG. 3 as an iteration number k increases.

That is $$MAD(k) = \frac{1}{HW} \sum_{i}^{H} \sum_{j}^{W} \left| \hat{G}^{(k)}(i,j) - \hat{G}^{(k-1)}(i,j) \right| \quad (4)$$

where the integers H and W are the height and width of the image, respectively. Extensive simulations have shown that the MAD(k) value will monotonically decrease towards zero, as the iteration number, k, increases. This indicates that the proposed IRI process indeed converges. To demonstrate this, four test color images are randomly picked from the Kodak and the IMAX datasets, and their corresponding MAD(k) values resulting from the IRI process conducted along the horizontal direction are shown in FIG. 4. Note that similar curves have been obtained for the IRI process performed along the vertical direction as well (though these are not shown here).

Unfortunately, despite the convergence property of the IRI process, it has been observed that the overall quality of the processed images may start to degrade after several iterations. This is mainly because each IRI process is performed along one direction only (i.e., either in horizontal or in vertical direction), while in natural images the image structures (such as edges and textures) can be oriented along various directions. Consequently, the IRI process may cause error propagation around those image structures that are not approximately oriented along the same direction as that in which the IRI process is performed.

Based on this observation, it is not desirable to perform the IRI process until it converges. Therefore, the embodiment uses a stopping criterion to stop the IRI process before the degradation starts to appear. For that, a threshold η is set, and the iterative process is terminated once MAD(k)<η. In all the experiments presented below, the threshold η was set at the empirically-derived value 0.5, as illustrated in FIG. 4. It has been observed from our simulations that the IRI process will typically be terminated after 2 to 6 iterations with such a threshold value.

Final Reconstructions of Color Channels

Suppose the horizontal IRI process is stopped at iteration $K_h$, then the reconstructed G-channel image along the horizontal direction will be set as $\hat{G}_h = \hat{G}_h^{(K_h)}$.

To obtain the reconstructed G-channel image along the vertical direction, the entire above-described IRI process of FIG. 3 will be applied to the initial mosaiced images, but in this case along the vertical direction in each stage of FIG. 3 (step 2 of FIG. 2). This gives a reconstructed G-channel image $\hat{G}_v = \hat{G}_v^{(K_v)}$.

In order to generate the final reconstructed G-channel image (step 3 of FIG. 2), the two reconstructed G-channel images, i.e., $\hat{G}_h$ and $\hat{G}_v$, are linearly combined using a soft-decision scheme. For that, respective weights of $\hat{G}_h(i,j)$ and $\hat{G}_v(i,j)$ are computed. The weights are denoted as $w_h(i,j)$ and $w_v(i,j)$ respectively, at each pixel location (i,j) where the G-component value is missing. It is expected that the smoother the residual field, the easier it is to interpolate the residuals, and consequently the more accurate the corresponding restored values will be. Therefore, $w_h(i,j)$ and $w_v(i,j)$ can be computed by simply taking the inverse of the square of the residual gradient, in a way similar to the soft-decision schemes of several existing CDI-based methods (e.g., [5,7]), except that the residual gradient instead of the CD (color component difference) gradient. That is $$w_h(i,j) = \frac{1}{\sigma_h(i,j)^2} \text{ and } w_v(i,j) = \frac{1}{\sigma_v(i,j)^2} \quad (5)$$

where $\sigma_h = F * |\partial_h * \Delta G_h^{(K_h)}|$ and $\sigma_v = F * |\partial_v * \Delta G_v^{(K_v)}|$.

Symbol * denotes the convolution operation, and $\partial_h$ and $\partial_v$ are the 1-D gradient operators [−1, 0, 1] and [−1, 0, 1]$^T$, respectively. The Gaussian filter F is deployed here to take the neighboring pixels into consideration for yielding more reliable measurements on the gradients of residuals. The 5×5 Gaussian kernel with a standard variation of 2 is empirically set for F. Finally, $\hat{G}_h$ and $\hat{G}_v$ are linearly combined as $$\hat{G}(i,j) = \frac{w_h(i,j)\hat{G}_h(i,j) + w_v(i,j)\hat{G}_v(i,j)}{w_h(i,j) + w_v(i,j)} \quad (6)$$

Based on the reconstructed G-channel image, i.e., $\hat{G}$, the R channel and the B channel were separately restored (step 4 of FIG. 2) using the same RI-based reconstruction scheme as employed in [8] (i.e., via FIG. 1), except using a different window size for the regression filtering. [8] suggested 11×11, but we found that 7×7 gave a better PSNR performance.

EXPERIMENTAL RESULTS

The proposed IRI demosaicing method has been evaluated on the Kodak (12 images) and the IMAX (18 images) datasets that have been commonly used for evaluating demosaicing performance (e.g., [6,8,10,11]). Each full-color image is first downsampled according to the Bayer pattern [1], followed by conducting demosaicing process using various methods under comparison. The differences between the original and the reconstructed images are measured in terms of the PSNR measured for each channel and the CPSNR computed by combining all three channels together. Our proposed method was compared with six state-of-the-art demosaicing methods: local polynomial approximation (LPA) [3], integrated gradient (IGD) [4], gradient based threshold free demosaicing (GBTF) [5], local directional interpolation and nonlocal-adaptive thresholding (LDI-NAT) [6], residual interpolation (RI) [8], and minimum-Laplacian residual interpolation (MLRI) [10].

The PSNRs and CPSNRs are reported in Table 1. In particular, the proposed method outperforms the original RI-based method [8] in both datasets. It has been pointed out in [8] that LPA, IGD, and GBTF work quite well for the Kodak dataset. Despite that, the embodiment is slightly inferior to these three methods in terms of objective measurement; however, the subjective performance in terms of perceptual quality is superior. Furthermore, if both datasets are combined and jointly evaluated, the embodiment outperforms all other methods in PSNR, as shown in Table 1.

TABLE 1

| | Kodak | | | | IMAX | | | | Kodax + IMAX | | | |
| | PSNR | | | | PSNR | | | | PSNR | | | |
| Methods | R | G | B | CPSNR | R | G | B | CPSNR | R | G | B | CPSNR |
|---|---|---|---|---|---|---|---|---|---|---|---|---|
| LPA[3] | 41.59 | 44.37 | 40.94 | 42.05 | 34.34 | 37.86 | 33.29 | 34.70 | 37.24 | 40.46 | 36.35 | 37.64 |
| IGD[4] | 41.71 | 44.85 | 41.10 | 42.35 | 34.33 | 37.38 | 33.45 | 34.09 | 34.28 | 40.37 | 36.51 | 37.72 |
| GBTF[5] | 41.63 | 44.75 | 40.95 | 42.14 | 33.54 | 36.57 | 32.72 | 33.92 | 36.78 | 39.84 | 36.01 | 37.21 |
| LDI-NAT[6] | 38.30 | 40.49 | 37.94 | 38.77 | 36.28 | 39.76 | 34.39 | 36.20 | 37.09 | 40.05 | 35.81 | 37.23 |
| RI[8] | 39.64 | 42.17 | 38.87 | 39.99 | 36.07 | 39.99 | 35.35 | 36.48 | 37.50 | 40.86 | 36.76 | 37.88 |
| MLRI[10] | 40.59 | 42.97 | 39.86 | 40.94 | 36.35 | 39.90 | 35.36 | 36.62 | 38.04 | 41.13 | 37.16 | 38.35 |
| Embodiment | 40.29 | 43.97 | 39.97 | 41.01 | 36.70 | 40.35 | 35.84 | 37.06 | 38.13 | 41.72 | 37.49 | 38.64 |

Figures 5A, 5B, 5C, 5D:
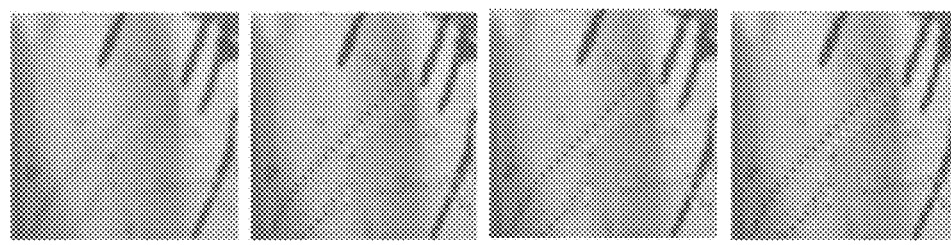
FIG. 5, which is composed of FIG. 5(*a*) to (*h*), shows demosaicing results for a region in the "IMAX 5" image using eight respective algorithms.
Figures 5E, 5F, 5G, 5H:
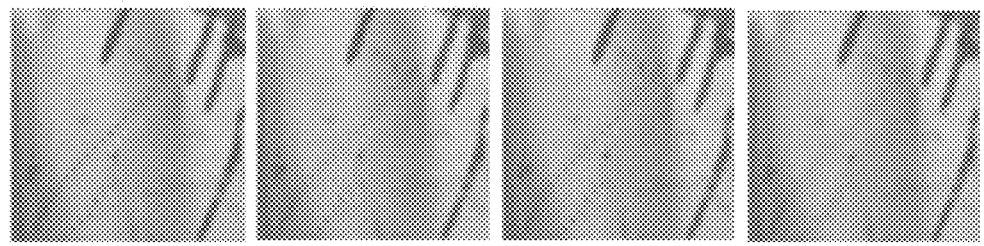
Figures 6A, 6B, 6C, 6D:
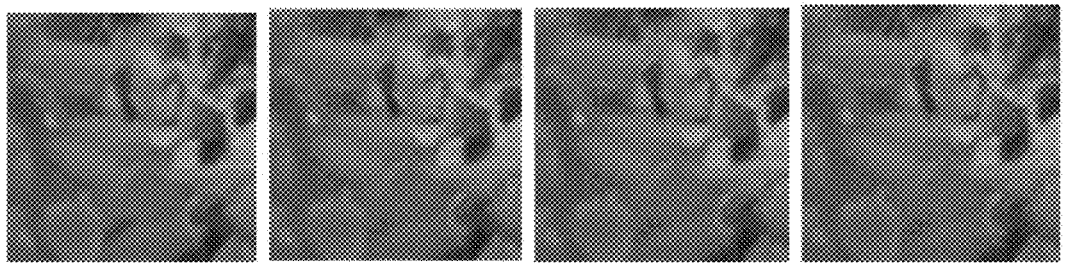
FIG. 6, which is composed of FIG. 6(*a*) to (*h*), shows demosaicing results for a region in the "IMAX 17" image using eight respective algorithms.
Figures 6E, 6F, 6G, 6H:
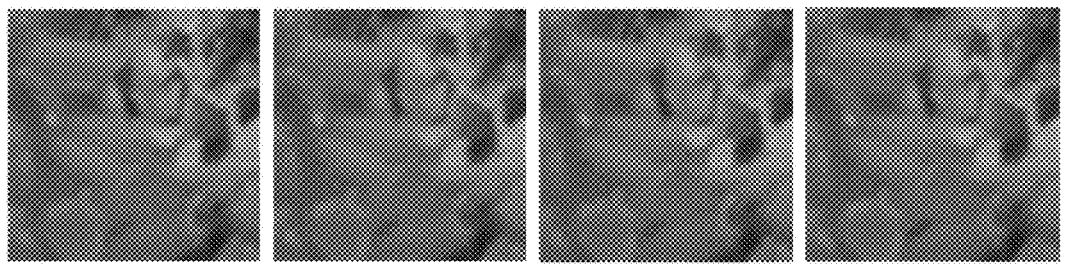
Figures 7A, 7B, 7C, 7D:
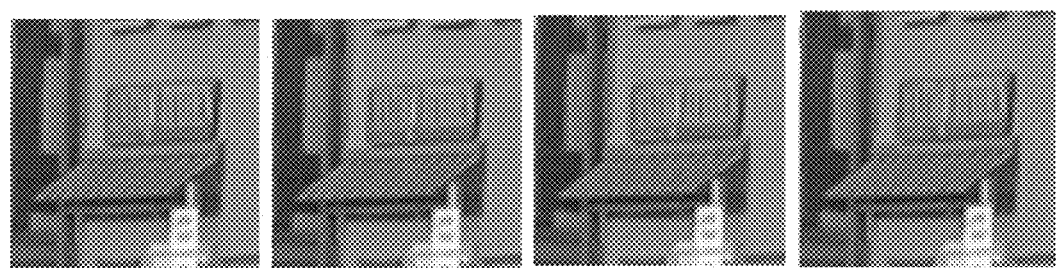
FIG. 7, which is composed of FIG. 7(*a*) to (*h*), shows demosaicing results for a region in the "Kodak 4" image using eight respective algorithms.
Figures 7E, 7F, 7G, 7H:
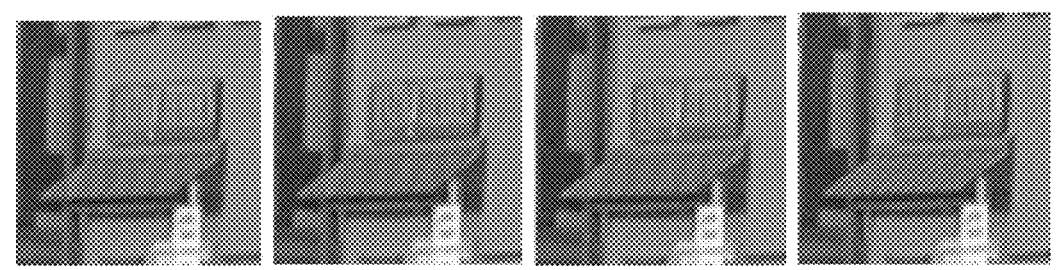

Besides the objective quality evaluation, the embodiment also shows clear advantages on the subjective quality evaluation. A visual comparison of the demosaicing results for a region with busy colors of the "IMAX 5" image is shown in FIG. 5. Several other test images also clearly demonstrate such superior performance on visual quality assessment, as shown in FIG. 6 to FIG. 8, in which the test image used is respectively the IMAX 17 image, the Kodak 4 image, and the Kodak 8 image. In each of FIGS. 5-8, (a) is the original image, (b) denotes the image demosaiced by LPA [3], (c) denotes the image demosaiced by IGD [4], (d) denotes the image demosaiced by GBTF [5], (e) denotes the image demosaiced by LDI-NAT [6], (f) denotes the image demosaiced by RI [8], (g) denotes the image demosaiced by MLRI [10], and (h) denotes the image demosaiced by the embodiment.

Variations of the Embodiment

Many variations of the embodiment are possible within the scope of the invention.

Firstly, it is not essential to perform the iteration in the vertical and horizontal directions separately. However, in experiments we have performed doing both directions at once, the performance is not as good, because the two-dimension FIR filter (which replaces the one dimensional filter used for linear interpolation in the embodiment) destroys edge information in the image at the very beginning.

Figure 1:
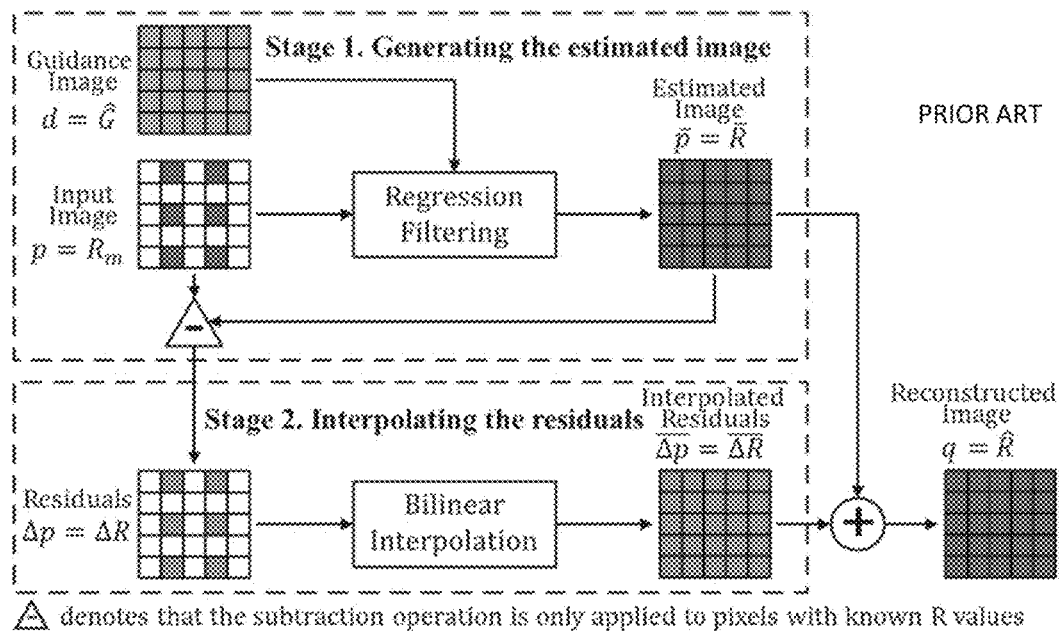
FIG. 1 shows schematically the steps of a known demosaicing algorithm.

Secondly, it will be noted that whereas in the embodiment the interpolated values are subject to regression filtering, in [8] (as shown by FIG. 1) the regression filtering is performed directly on the ground truth images, using the interpolated green image only for guidance. One variation of the embodiment is thus that, at least in the first iteration, the regression filtering is performed on the ground truth values, using the interpolated images only for guidance. The result will tend to be slightly inferior, but very close. However, using the interpolated values, as shown in FIG. 3, is gives improved ease of implementation.

REFERENCES

The disclosure of the following documents is incorporated herein in its entirety by reference:
[1] B. E. Bayer, "Color imaging array," U.S. Pat. No. 3,971,065, 1976.
[2] D. Menon, S. Andriani, and G. Calvagno, "Demosaicing with directional filtering and a posteriori decision," IEEE Trans. on Image Processing, vol. 16, no. 1, pp. 132-141, 2007.
[3] D. Paliy, V. Katkovnik, R. Bilcu, S. Alenius, and K. Egiazarian, "Spatially adaptive color filter array interpolation for noiseless and noisy data," International Journal of Imaging Systems and Technology, vol. 17, no. 3, pp. 105-122, 2007.
[4] K. H. Chung and Y. H. Chan, "Low-complexity color demosaicing algorithm based on integrated gradients," Journal of Electronic Imaging, vol. 19, no. 2, pp. 021104, 2010.
[5] I. Pekkucuksen and Y. Altunbasak, "Gradient based threshold free color filter array interpolation," in Proc. of IEEE Int. Conf. on Image Processing, Hong Kong, 2010, pp. 137-140.
[6] L. Zhang, X. Wu, A. Buades, and X. Li, "Color demosaicking by local directional interpolation and nonlocal adaptive thresholding," Journal of Electronic Imaging, vol. 20, no. 2, pp. 023016, 2011.
[7] I. Pekkucuksen and Y. Altunbasak, "Multiscale gradients based color filter array interpolation," IEEE Trans. on Image Processing, vol. 22, no. 1, pp. 157-165, 2013.
[8] D. Kiku, Y. Monno, M. Tanaka, and M. Okutomi, "Residual interpolation for color image demosaicking," in Proc. of IEEE Int. Conf. on Image Processing, Melbourne, Australia, 2013, pp. 2304-2308.
[9] K. He, J. Sun, and X. Tang, "Guided image filtering," IEEE Trans. on Pattern Analysis and Machine Intelligence, vol. 35, no. 6, pp. 1397-1409, 2013.
[10] D. Kiku, Y. Monno, M. Tanaka, and M. Okutomi, "Minimized-laplacian residual interpolation for color image demosaicking," in IS&T/SPIE Electronic Imaging. International Society for Optics and Photonics, 2014, pp. 90230L-90230L.
[11] X. Li, B. Gunturk, and L. Zhang, "Image demosaicing: A systematic survey," in Proc. of SPIE, 2008, pp. 68221J-68221J-15.

The invention claimed is:

1. A method of processing a two-dimensional image comprising an array of pixels, the pixels being composed of (i) a first set of pixels at each of which only a ground truth red color intensity value is defined, (ii) a second set of pixels at each of which only a ground truth blue color intensity value is defined and (iii) a third set of pixels at each of which only a ground truth green color intensity value is defined, to form a two-dimensional image comprising an array of pixels at each of which a color intensity value is defined for each of red, green and blue colors;
the method including:
(a) applying at least one filter to the ground truth intensity values, to define, for each color, at least one respective interpolated color value at each of the pixels;
(b) for each of the colors, performing regression filtering using as guidance the interpolated color values for at least one of the other colors, to form an estimated color value;
(c) for each of the colors, obtaining residual values at the corresponding set of pixels as the difference between the estimated color value and the ground truth color value,
(d) for each of the colors, interpolating the residual values;
(e) for each of the colors, adding the interpolated residual values to the estimated color values to form a refined color value at each of the pixels; and
(f) repeating the set of steps (b)-(e) at least once;
in each said repetition, said step (b) being performed for each color using as guidance the refined color values for at least one of the other colors generated during the preceding performance of step (e); and wherein each time step (e) is repeated, a mean difference value is calculated indicative of the difference averaged over the image between the refined color values which step (e) produces and the refined color values produced in the previous performance of step (e), the repetition of steps (b)-(e) being terminated if the difference value is below a threshold.

2. A method according to claim 1 in which, in the first performance of step (b), the regression filtering is performed for each color on the corresponding interpolated color values.

3. A method according to claim 2 in which the generation of the red and blue channel images is not iterative.

4. A method according to claim 1 in which each said repetition of step (b) is performed on the corresponding refined color values generated during the preceding performance of step (e).

5. A method according to claim 1, in which step (a) applies a horizontal filter and a vertical filter to the ground truth intensity values, to define, for at least one color, respective horizontally and vertically interpolated color values at each of the pixels;
steps (b)-(e) being performed separately for the horizontally and vertically interpolated color values, to generate, each of the pixels, respective said estimated color values, respective said residual values, respective said interpolated residual values, and respective said refined color values, and
the method including a step of combining the refined color values at each of the pixels to form final estimated color values.

6. A method according to claim 5 in which each final estimated color value is a weighted sum of the two refined color values respectively obtained through the horizontal and vertical processing, where the respective weights of the refined values may be different at each pixel.

7. A method according to claim 6 in which, for each of the horizontal and vertical directions, the respective weights are calculated by obtaining a measure of the smoothness of the respective set of residual values at the corresponding pixel, and setting each of the weights to be higher according to whether the smoothness of the respective set of residual values is greater than the smoothness of the other set of residual values.

8. A method according to claim 1, including a step, prior to the repetition of steps (b)-(e), of setting a window size of at least one window used in the regression filtering.

9. A method according to claim 8 in which the window size being a function of at least one parameter t,
 wherein t is set to maximise the window size subject to a constraint that an average over the pixels of a smoothness measure of the residual values within the window, is below a threshold.

10. A method according to claim 1 which is used to obtain a green channel image having green color intensity values at each of the pixels, the green channel image being used to generate red and blue channel images.

11. A system comprising a processor, and a memory device, the memory device storing program instructions operative, when performed by the processor, to cause the processor to perform a method according to claim 1.

* * * * *